United States Patent
Opshaug et al.

(10) Patent No.: US 9,426,609 B2
(45) Date of Patent: Aug. 23, 2016

(54) METHODS, APPARATUSES, AND DEVICES FOR PROCESSING POSITIONING REFERENCE SIGNALS

(71) Applicant: QUALCOMM Incorporated, San Diego, CA (US)

(72) Inventors: Guttorm R. Opshaug, Redwood City, CA (US); Arash Mirbagheri, San Diego, CA (US); Borislav Ristic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 14/163,907

(22) Filed: Jan. 24, 2014

(65) Prior Publication Data

US 2015/0215729 A1 Jul. 30, 2015

(51) Int. Cl.
| | |
|---|---|
| *H04W 4/02* | (2009.01) |
| *H04B 7/08* | (2006.01) |
| *G01S 5/02* | (2010.01) |
| *G01S 5/10* | (2006.01) |

(52) U.S. Cl.
CPC ............ *H04W 4/02* (2013.01); *G01S 5/0215* (2013.01); *G01S 5/0268* (2013.01); *H04B 7/0802* (2013.01); *G01S 5/10* (2013.01)

(58) Field of Classification Search
None
See application file for complete search history.

(56) References Cited

U.S. PATENT DOCUMENTS

| | | | | |
|---|---|---|---|---|
| 7,940,740 | B2* | 5/2011 | Krishnamurthy | H04L 5/0007 370/235 |
| 8,582,698 | B2* | 11/2013 | Andgart | G01S 5/0221 342/108 |
| 8,891,480 | B2* | 11/2014 | Bachu | H04L 5/0007 370/312 |
| 2005/0004482 | A1* | 1/2005 | Drakulic | A61B 5/0006 600/509 |
| 2010/0195566 | A1* | 8/2010 | Krishnamurthy | H04L 5/0007 370/328 |

(Continued)

FOREIGN PATENT DOCUMENTS

WO   WO-2011139201 A1   11/2011

OTHER PUBLICATIONS

3gpp Ran 4: "LTE; Evolved Universal Terrestrial Radio Access (E-UTRA); Requirements for support of radio resource management (3GPP TS 36.133 version 10.5.0 Release 10)" In: "LTE; Evolved Universal Terrestrial Radio Access (E-UTRA); Requirements for support of radio resource management (3GPP TS 36.133 version 10.5.0 Release 10)", Jan. 1, 2012, European Telecommunications Standards Institute (ETSI), Sophia-Antipolis; France, XP055070677, pp. 1-447.

(Continued)

*Primary Examiner* — Ashish K Thomas
(74) *Attorney, Agent, or Firm* — Berkeley Law & Technology Group, LLP

(57) ABSTRACT

Methods, apparatuses, and devices for processing Positioning Reference Signals (PRS) bursts are presented. In one example, a mobile device may acquire a first PRS burst transmitted from a base station through first transmitter antenna port and acquire a second PRS burst transmitted from a base station through a second antenna port. The mobile device may select between the first and second acquired PRS bursts for use in positioning operations such as observed time difference of arrival.

30 Claims, 6 Drawing Sheets

(56) References Cited

U.S. PATENT DOCUMENTS

| | | | |
|---|---|---|---|
| 2011/0117925 A1 | 5/2011 | Sampath et al. | |
| 2011/0117926 A1* | 5/2011 | Hwang | H04W 64/00 455/456.1 |
| 2011/0143773 A1* | 6/2011 | Kangas | G01S 5/02 455/456.1 |
| 2011/0274220 A1* | 11/2011 | Andgart | G01S 5/0221 375/342 |
| 2012/0040696 A1* | 2/2012 | Siomina | G01S 5/0036 455/456.6 |
| 2012/0108270 A1 | 5/2012 | Kazmi et al. | |
| 2012/0165053 A1* | 6/2012 | Yoon | H04L 5/0048 455/501 |
| 2012/0264450 A1 | 10/2012 | Kangas et al. | |
| 2013/0176883 A1 | 7/2013 | Han et al. | |
| 2013/0285856 A1 | 10/2013 | Opshaug et al. | |
| 2014/0155082 A1* | 6/2014 | Krauss | G01S 19/22 455/456.1 |
| 2014/0349677 A1* | 11/2014 | Xiao | H04W 4/02 455/456.1 |

OTHER PUBLICATIONS

International Search Report and Written Opinion—PCT/US2015/011656—ISA/EPO—May 4, 2015.

\* cited by examiner

METHODS, APPARATUSES, AND DEVICES FOR PROCESSING POSITIONING REFERENCE SIGNALS

BACKGROUND

1. Field

The subject matter disclosed herein relates to mobile electronic devices, and, more particularly, to methods, apparatuses, and articles of manufacture that may be used to acquire differing wireless positioning reference signals transmitted during differing occasions.

2. Information

The Global Positioning System (GPS) and other like satellite positioning systems (SPS) have enabled navigation services for mobile devices in many types of outdoor environments. In addition to, or in place of, SPS-based approaches for obtaining accurate estimations of position, a mobile device may employ positioning approaches that may involve acquisition of signals transmitted by terrestrial transmitters, such as cellular base station transmitters, which may be positioned at known locations. Such approaches may include, for example, observed time difference of arrival (OTDOA) and/or other procedures, such as advanced forward link trilateration (AFLT).

For example, if an OTDOA technique is utilized, a cellular communications network may estimate a position of a mobile device responsive to a mobile device reporting differences in observed time of arrival of signals transmitted from cellular base stations. However, if one or more signals received at a mobile device are distorted and/or accompanied by excessive interference, the mobile device may be unable to acquire the signal and, consequently, be unable to accurately determine time of arrival of signals. Consequently, a mobile device may report inaccurate values of observed time differences among acquired signals. Such inaccuracies in time of arrival, if processed by a cooperating cellular network, may give rise to considerable errors in computing an estimated location of the mobile device.

Errors in estimating a position of a mobile device, which may be brought about by measurement of distorted and/or noisy signals transmitted from cellular base stations, may be particularly troubling in many scenarios. For example, in an emergency services setting, in which an enhanced 911 system (e.g., E-911) may be used to locate one or more mobile device users who may need medical assistance, paramedics may spend an inordinate period of time attempting to locate an injured mobile device user on a busy highway. In other instances, position estimation errors may bring about reduced accuracy of turn-by-turn directions provided by a navigation or route planning application. Such misdirection can be a source of frustration among many types of mobile device users who rely on a capability for accurate position estimation.

SUMMARY

Briefly, particular implementations may be directed to a method comprising, at a mobile device, acquiring a first Positioning Reference Signals (PRS) burst transmitted from a base station during a first occasion, and acquiring a second PRS burst transmitted from the base station during a second occasion. The method further comprises selecting between the first and second acquired PRS bursts for use in positioning operations based, at least in part, on one or more performance criteria.

Another particular implementation may be directed to a mobile device, comprising a receiver to receive signals from a communications channel and one or more processors coupled to the receiver to acquire a first PRS burst received at the receiver and transmitted from a base station during a first occasion. The one or more processors are further to acquire a second PRS burst transmitted from the base station during a second occasion and to select between the first and second acquired PRS bursts for use in positioning operations based, at least in part, on one or more performance criteria.

Another particular implementation may be directed to an article comprising a storage medium having machine-readable instructions stored thereon, which are executable by one or more processors of a mobile device to acquire a first PRS burst transmitted from a base station during a first occasion. The machine-readable instructions are additionally to acquire a second PRS burst transmitted from the base station during a second occasion strikethrough and to select between the first and second acquired PRS bursts for use in positioning operations based, at least in part, on one or more performance criteria.

Another particular implementation may be directed to an article comprising a storage medium comprising machine-readable instructions stored thereon which are executable by one or more processors of a mobile device to acquire a first PRS burst transmitted from a base station during a first occasion and to acquire a second PRS burst transmitted from the base station during a second occasion. The machine-readable instructions, which may be executable by the one or more processors, may additionally give rise to the mobile device selecting between the first and second acquired PRS bursts for use in positioning operations based, at least in part, on one or more performance criteria.

Another particular implementation may be directed to a mobile device, comprising means for acquiring a first PRS burst transmitted from a base station during a first occasion. The mobile device further comprises means for acquiring a second PRS burst transmitted from the base station during a second occasion, and means for selecting between the first and second acquired PRS bursts for use in positioning operations based, at least in part, on one or more performance criteria.

It should be understood that the aforementioned implementations are merely example implementations, and that claimed subject matter is not necessarily limited to any particular aspect of these example implementations.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
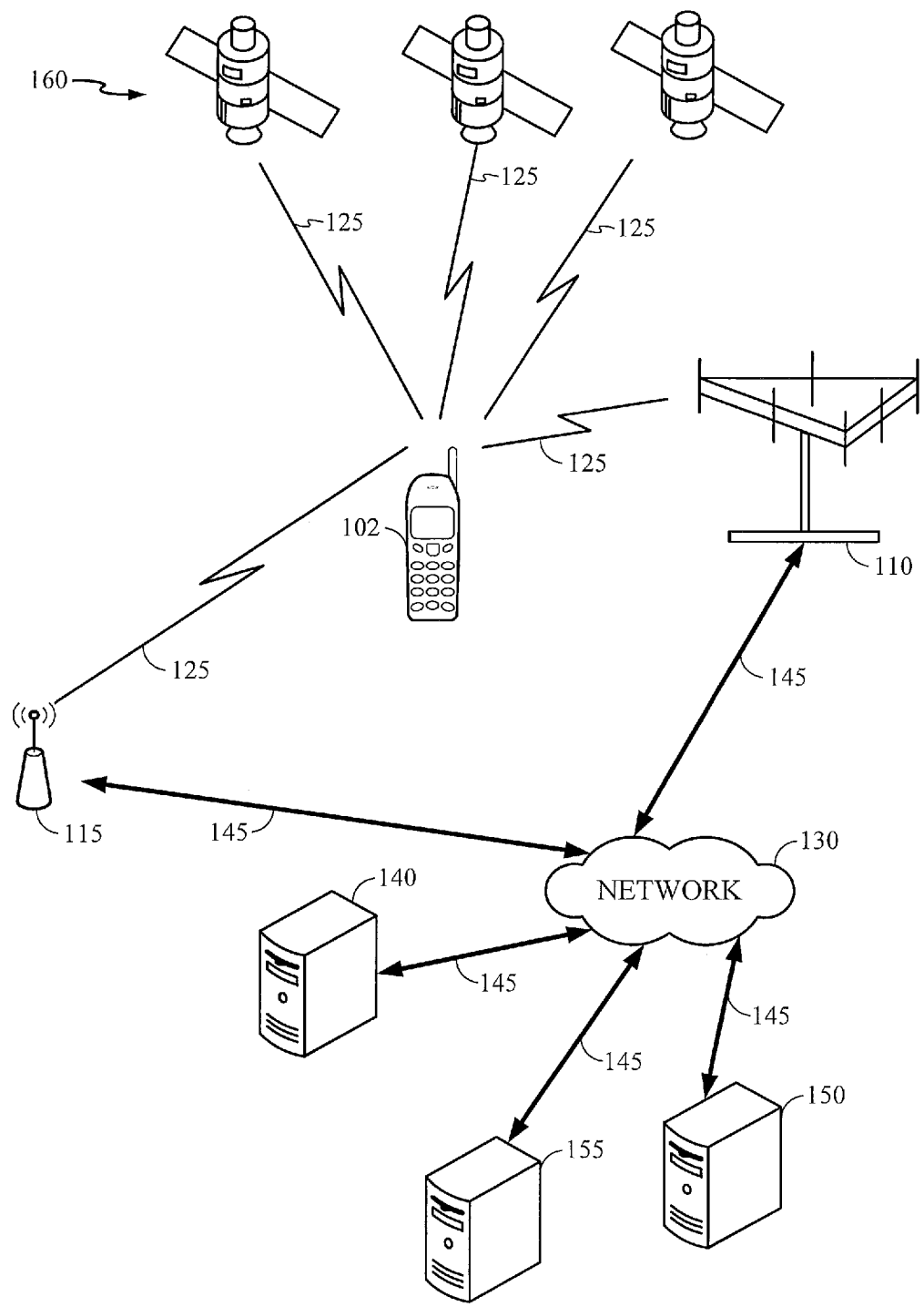
FIG. 1 is a schematic diagram of a network topology according to an embodiment.

In the following detailed description, numerous specific details are set forth to provide a thorough understanding of claimed subject matter. However, those skilled in the art will understand that claimed subject matter may be practiced without these specific details. In other instances, methods, apparatuses, and/or systems that would be known by one of ordinary skill have not been described in detail so as not to obscure claimed subject matter.

As used herein, "mobile electronic device," "mobile device," "wireless device," or the plural form of such terms may be used interchangeably and may refer to any kind of special purpose computing platform or apparatus that may from time to time occupy a position that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be referred to simply as "mobile devices," may include, for example, cellular telephones, smart telephones, personal digital assistants, wearable computers, wrist phones, laptop computers, personal entertainment systems, tablet personal computers, personal audio or video devices, personal navigation devices, or the like. It should be appreciated, however, that these are merely examples of mobile devices that may be used, at least in part, to implement one or more operations and/or techniques for estimating a position of a mobile device, for example, and that claimed subject matter is not limited in this respect. It should also be noted that the terms "position" and "location" may be used interchangeably herein.

As used herein, a "Positioning Reference Signals" burst or "PRS burst" may refer to one or more transmissions made by, for example, a cellular base station for the purposes of permitting a mobile device to measure time of arrival of a PRS burst in relation to other acquired signals, such as other PRS bursts, for example. A PRS burst may be transmitted using one or more transmitter antenna ports of a cellular base station at periodic intervals under the control of a cellular network controller, for example. A PRS burst may make use of one or more "resource elements" allocated by a cellular base station for transmission of a PRS burst. A resource element may comprise, for example, a unit of frequency bandwidth of a subcarrier, such as approximately 5.0 kHz, approximately 10.0 kHz, approximately 15.0 kHz, etc. In addition to a unit of subcarrier frequency bandwidth, a resource element may comprise a particular transmission time interval, such as a length of time consumed in transmitting one symbol, two symbols, etc. Further, a resource element may be assigned to a particular antenna port of a cellular base station transmitter. Antenna ports of a base station transmitter may be coupled to a physical antenna or any other type of radiating structure capable of launching an electromagnetic signal comprising one or more carrier and subcarrier frequencies to a wireless communications channel.

Thus, in one possible non-limiting example, a cellular base station may transmit a PRS burst utilizing a resource element comprising an approximately 15.0 kHz bandwidth over a time span appropriate for transmitting one orthogonal frequency division multiplexed (OFDM) symbol using an transmitter antenna port that may be coupled to a dipole or monopole antenna, for example. In embodiments, OFDM signals may be modulated, for example, by a 4-state, a 16-state, or a 64-state quadrature amplitude modulation (QAM) scheme. Carrier frequencies may be centered at, for example, 1700 MHz, 1900 MHz, 2500 MHz, and so forth. It should be noted, however, that PRS bursts may consume resource elements in communication systems that may utilize different center frequencies, subcarrier frequency bandwidths, multiplexing schemes, modulation schemes, antenna ports, physical antennas or other radiating structures coupled to antenna ports, and so forth. In some embodiments, a PRS burst may be formed or generated in accordance with LTE (Long Term Evolution); Evolved Universal Terrestrial Radio Access (E-UTRA); Physical channels and modulation (ETSI TS 36.211 Version 10.0.0 Release 10); however claimed subject matter is not limited in this respect.

As previously alluded to, a mobile communications device may cooperate with a cellular network to estimate a current location of a mobile device by acquiring and processing signals from one or more cellular base stations. In one approach, which may accord with observed time difference of arrival (ODTOA), a number of base stations (e.g., three or more) may transmit a PRS burst to a mobile device. Responsive to receipt of PRS bursts from cellular base stations, for example, a mobile device may compute differences between times of arrival of PRS bursts and transmit computed time differences to a cellular network controller. In embodiments, a cellular network controller may, in turn, convert reported time differences, as observed by a mobile device, into estimated distances between a mobile device and one or more transmitting cellular base stations. A cellular network controller may relate known locations of transmitting cellular base stations with estimated distances and compute an estimated location of a mobile device. It should be noted, however, that OTDOA is but one of various approaches that may be employed to estimate a current location of a mobile device, and claimed subject matter is not limited in this respect.

In some instances, a PRS burst may become distorted in response to various phenomena that may affect communications channel quality. For example, a communications channel may introduce multipath fading, in which a signal transmitted from a cellular base station may arrive at a mobile device by way of direct and indirect signal paths. If direct and indirect transmitted signals interfere constructively, a relatively strong signal may be present at an antenna input port to the mobile device. If, however, signals from direct and indirect signal paths interfere destructively, a relatively small signal may be present at an antenna port of the mobile device. In some instances, as a mobile device user moves about a dense urban area, for example, in which buildings and other obstructions may bring about significant multipath fading, signals received via direct and indirect paths may, at times, interfere constructively. At other times, however, signals arriving via direct and indirect paths may interfere destructively. Accordingly, if a mobile device is receiving updates to an estimated position using an OTDOA approach, for example, a mobile device user may notice occasions of relatively accurate position estimation followed by occasions of relatively inaccurate position estimation. It should be noted that multipath fading may give rise to other phenomena, and claimed subject matter is not limited in this respect.

In other instances, a PRS burst may become attenuated if the signal is transmitted across a lengthy communications channel, for example. Thus, although one or more cellular network antennas may be situated at a distance of approximately 10.0-50.0 meters above ground, signals received at a mobile device may be significantly attenuated. In some instances, such as in rural areas in which cellular base stations may be separated by large distances, such as approximately 20.0 kilometers or more, a received PRS burst may only marginally exceed a background noise floor. In such instances, receiver circuitry of a mobile device may be unable to adequately distinguish a received PRS burst from background noise. Consequently, a mobile device may be unable to provide a cooperating cellular network with accurate measurements of time of arrival of PRS bursts. In turn, a cellular network controller coupled a cellular base station may be unable to accurately estimate position of a mobile device.

An approach toward enhancing a mobile device's ability to receive and acquire PRS bursts may comprise transmitting PRS bursts using two or more transmitter antenna ports of a cellular base station. In embodiments, transmit antenna diversity may reduce multipath fading, as observed at a mobile device, by providing two or more relatively independent signal paths through a communications medium, such as a wireless communications channel. Responsive to providing two or more relatively independent signal paths, a signal of increased amplitude may be present at an antenna of a mobile device. Accordingly, probability of signal fading may be reduced. Transmit diversity may bring about other benefits, and claimed subject matter is not limited in this respect.

In certain implementations, improvements to signal quality, such as increased signal strength and/or lower distortion, at a mobile device may be further enhanced by transmitting PRS bursts periodically, such as at approximately 500.0 millisecond intervals, approximately 250.0 millisecond intervals, approximately 160.0 millisecond intervals etc. PRS bursts may be organized into alternating even and odd "occasions," for example, wherein odd occasions may coincide with odd multiples of approximately 160.0 milliseconds, for example, and even occasions may coincide with even multiples of approximately 160.0 milliseconds. PRS bursts may be transmitted during even occasions through a first transmitter antenna port, and transmitted during odd occasions through a second transmitter antenna port. In particular implementations, for example, polarity of one or more symbols, such as symbols of a 16-state QAM constellation, may be alternated during even/odd occasions. For example, during a first type of occasion (e.g., "odd" occasions), a symbol corresponding to a positive value in a QAM constellation (e.g., "r") may be transmitted, and, during a second type of occasion (e.g., "even" occasions), a symbol corresponding to a negative value in a QAM constellation (e.g., "−r") may be transmitted. Such diversity in signal polarity may provide an even greater likelihood that a mobile device may receive relatively high quality PRS bursts, which may comprise increased signal strength and/or lower distortion, for example. It should be noted, however, that additional improvements to signal quality may be utilized, and claimed subject matter is not limited in this respect.

In certain embodiments, a mobile device may measure performance criteria of first and second PRS bursts, which may be acquired by a mobile device during odd and even transmission occasions. In particular embodiments, a mobile device may utilize a discriminator and/or a signal processor which may function to distinguish among differing received PRS bursts transmitted during odd and even occasions based, at least in part, on measurement of signal-to-noise ratios of acquired signals. In other embodiments, a discriminator and/or a signal processor may distinguish among acquired PRS bursts based, at least in part, on correlations in a time and/or a frequency domain. A discriminator and/or a signal processor may permit selection of PRS burst signals from odd and/or even occasions according to a best defined correlation peak. Correlation peaks may be determined in a time domain, such as by way of autocorrelation, or in a frequency domain, such as by way of Fourier analysis of acquired signals. A correlation peak width may be compared to a nominal correlation peak width, at least in some embodiments. These approaches may permit increased accuracy in estimating a time of arrival of a PRS burst, which may be advantageous in instances where accurate measurement of PRS signal bursts may assist in estimating a location of a mobile device.

In certain embodiments, a discriminator of a mobile device may compare one or more symbols detected in a first PRS burst, which may be transmitted through a first transmitter antenna port, with symbols detected in a second PRS burst, which may be transmitted through a second transmitter antenna port. A mobile device, based at least in part on an output signal from a discriminator, may determine that a first PRS burst comprises symbols of a different polarity than a second PRS burst. Consequently, a processor of a mobile device may determine that a first PRS burst was transmitted during a first type of occasion (e.g., an "odd" occasion), for example, and that a second PRS burst was transmitted during a second type of occasion (e.g., an "even" occasion). In response to a determination, a processor of a mobile device may assign certain acquired PRS bursts to a first type of occasion, such as an odd transmission occasion. Also in response to a determination, a processor of a mobile device may assign certain other acquired PRS bursts to a second type of occasion, such as an even transmission occasion. Such assignments to first and second types of occasions may, at least in some embodiments, enhance a mobile device's capability to acquire PRS bursts and, based at least partially on such acquisition, more precisely measure time of arrival of PRS bursts.

In certain embodiments, a discriminator of a mobile device may designate a first PRS burst as being transmitted during a first type of occasion responsive to, for example, detection of cell-specific reference signals by a processor. In particular embodiments, cell-specific reference signals (CRS) may inform a processor of a mobile device, for example, that a particular cellular base station may transmit PRS bursts using two or more types of occasions, such as odd and even transmission occasions. In other embodiments, one or more CRS may inform a processor of the mobile device that a cellular base station may make use of PRS bursts comprising additional transmission types of occasions, such as three types, four types, etc. Thus, PRS bursts may be assigned to particular types of occasions which may, for example, permit a mobile device to perform more precise measurements of a time of arrival of PRS bursts.

FIG. 1 is a schematic diagram of a network topology 100 according to an embodiment. As described below, one or more processes or operations for transmitting differing PRS bursts at differing types of occasions may be implemented in a signal environment that may be utilized by mobile device 102, for example. It should be appreciated that network topology 100 is described herein as a non-limiting example that may be implemented, in whole or in part, in the context of various communications networks or combination of networks, such as public networks (e.g., the Internet, the World Wide Web), private networks (e.g., intranets), wireless local area networks (WLAN, etc.), or the like. It should also be noted that claimed subject matter is not limited to any particular type of outdoor or indoor implementation. For example, at times, one or more operations or techniques described herein may be performed, at least in part, in an environment that may dense urban environments, suburban environments, rural environments, etc., and claimed subject matter is not limited in this respect.

As illustrated, network topology 100 may comprise, for example, one or more space vehicles 160, cellular base station 110, wireless transmitter 115, etc. capable of communicating with mobile device 102 via wireless communication links 125 in accordance with one or more protocols. Space vehicles 160 may be associated with one or more satellite positioning systems (SPS), such as, for example, the United States Global Positioning System (GPS), the Russian GLONASS system, the European Galileo system, as well as any system that may utilize space vehicles from a combination of SPSs, or any SPS developed in the future. Space vehicles 160 may also represent one or more orbiting space vehicles of a regional satellite navigation system such as, for example, Quasi-Zenith Satellite System (QZSS) over Japan, Indian Regional Navigational Satellite System (IRNSS) over India, Beidou/Compass over China, etc., and/or various augmentation systems (e.g., an Satellite Based Augmentation System (SBAS)) that may be associated with or otherwise enabled for use with one or more global and/or regional navigation satellite systems. It should be noted that claimed subject matter is not limited to the use of space vehicles such as those space vehicles of the aforementioned global or regional satellite navigation systems. Cellular base station 110, wireless transmitter 115, etc. may be of the same or similar type, for example, or may represent different types of devices, such as access points, radio beacons, cellular base stations, femtocells, or the like, depending on an implementation. At times, one or more wireless transmitters, such as wireless transmitters 115, for example, may be capable of transmitting as well as receiving wireless signals.

In some instances, one or more cellular base stations 110, wireless transmitters 115, etc. may, for example, be operatively coupled to a network 130 that may comprise one or more wired or wireless communications or computing networks capable of transmitting messages including items, such as an electronic digital map, that may be relevant to a mobile device user's estimated location via one or more wireless communication links 125, 145, and so forth. A position of the mobile device 102 may be estimated using one or more PRS bursts transmitted to a mobile device 102 by a number, such as three or more, of cellular base stations 110. As described further below, increasing accuracy in estimating a time of arrival of a PRS burst, may be advantageous in instances where accurate measurement of PRS signal bursts may assist in estimating a location of mobile device 102.

Even though a certain number of computing platforms or devices are illustrated herein, any number of suitable computing platforms or devices may be implemented to facilitate or otherwise support one or more techniques or processes associated with network topology 100. For example, at times, network 130 may be coupled to one or more wired or wireless communications networks (e.g., Wi-Fi, etc.) so as to enhance a predominantly indoor coverage area for communications with mobile device 102, one or more cellular base stations 110, wireless transmitters 115, servers 140, 150, 155, or the like. In some instances, network 130 may facilitate or support femtocell-based operative regions of coverage, for example. Again, these are merely example implementations, and claimed subject matter is not limited in this regard.

Figure 2A:
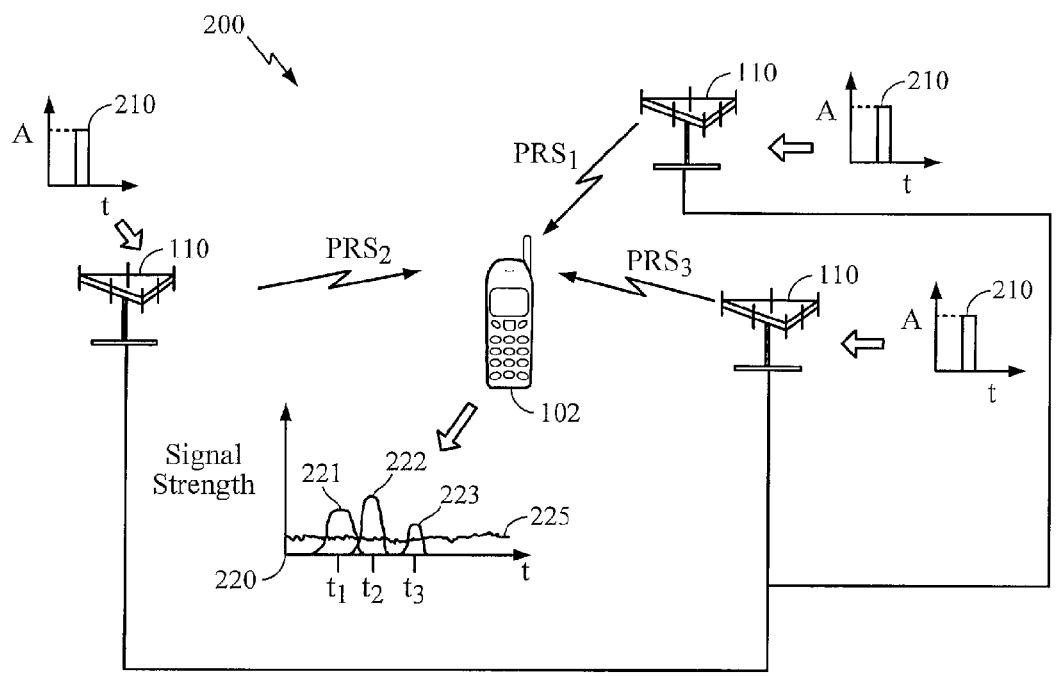
FIGS. 2A-2B are schematic diagrams of a portion of a cellular communications network that transmits PRS bursts for acquisition by a mobile device according to an embodiment.

FIG. 2A is a schematic diagram of a portion of a cellular communications network that transmits PRS bursts for acquisition by a mobile device according to an embodiment. In FIG. 2A, schematic diagram 200 comprises three cellular base stations 110 that may be seen at various locations remote from mobile device 102. Although three cellular base stations 110 are shown in FIG. 2A, any number of cellular base stations may be in at least occasional communication with mobile device 102, and claimed subject matter is not limited to communication with any particular number of base stations. In embodiments, a cellular communications network, which may comprise cellular base stations 110, may utilize one or more synchronizing elements to coordinate timing so that PRS bursts 210 may be transmitted according to particular timing constraints. However, it should be noted that claimed subject matter may include implementations in which PRS bursts are transmitted under the control of different portions of a communication network, such as a cellular network controller, that may communicate with cellular base stations 110.

PRS bursts 210 may be allocated to one or more resource elements and may comprise a particular amplitude that may be approximately uniform across cellular base stations 110. PRS bursts may be transmitted over a time span sufficient to transmit one or more OFDM symbols. Modulated PRS burst 210 may be transmitted using antenna ports coupled to one or more antennas situated on a cellular base station tower. In embodiments, OFDM symbols may be modulated using one or more carrier frequencies by way of an appropriate modulation scheme, such as, for example, a 4-state, 16-state, 64-state, or other type of QAM scheme. PRS bursts may be conveyed by way of carrier signals $PRS_1$, $PRS_2$, and $PRS_3$ across a wireless communications channel to mobile device 102. Upon or shortly after reception of carrier signals $PRS_1$, $PRS_2$, and $PRS_3$, mobile device 102 may, for example, downconvert, demodulate, and perform other signal processing operations. Downconverted, demodulated, and processed acquired signals may be seen in FIG. 2A, using signal strength graph 220.

Signal strength graph 220 is shown as comprising three waveforms comprising peaks $t_1$, $t_2$, and $t_3$ as shown in FIG. 2A. In the example of FIG. 2A, waveform 221, comprising a peak at may correspond to acquired signal $PRS_1$, waveform 222, comprising a peak at $t_2$, may correspond to acquired signal $PRS_2$, and waveform 223, comprising a peak at $t_3$, may correspond to acquired signal $PRS_3$. Accordingly it may be inferred that acquired signals representing signals $PRS_1$, $PRS_2$, and $PRS_3$ arrive a different times and are of amplitude greater than noise floor 225. Responsive to temporal alignment of peaks of acquired waveforms with times $t_1$, $t_2$, and $t_3$, mobile device 102 may report differences in time of arrival of acquired signals. Thus, in particular implementations, mobile device 102 may report values for $t_3-t_2$, $t_3-t_1$, and $t_2-t_1$, for example, to one or more of cellular base stations 110. In turn, position may be computed based, at least in part, on observed time differences.

Figure 2B:
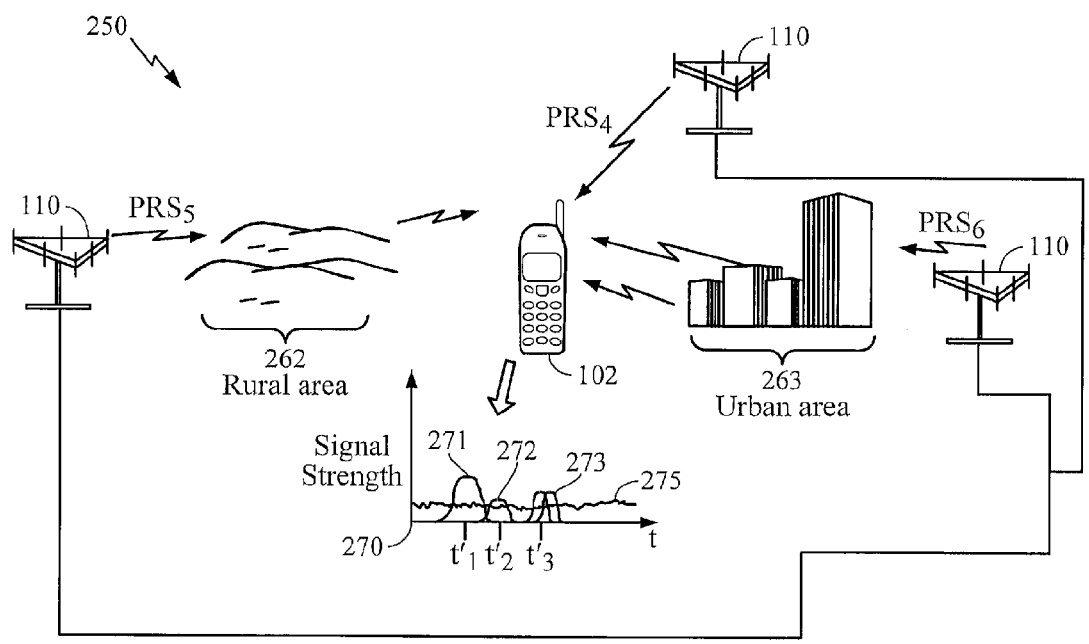

FIG. 2B is a schematic diagram 250 of a portion of a cellular communications network that transmits PRS bursts for acquisition by a mobile device according to an embodiment. In FIG. 2B, as in FIG. 2A, three cellular base stations 110 may be seen at various locations remote from mobile device 102. Although three cellular base stations 110 are shown in FIG. 2B, any number of cellular base stations may be in at least occasional communication with mobile device 102, and claimed subject matter is not limited to communications with any particular number of base stations. In FIG. 2B, a cellular communications network, which may comprise cellular base stations 110, may utilize one or more synchronizing elements to coordinate timing among PRS bursts 210. However, it should be noted that claimed subject matter may include implementations in which PRS bursts are transmitted under the control of other portions of a communications network that may include cellular base stations 110 and mobile device 102.

PRS bursts 210 may be allocated to one or more resource elements, which may comprise approximately equal amplitude and may be transmitted over a time span sufficient for transmitting one or more OFDM symbols. In embodiments, OFDM signals may be modulated using one or more carrier frequencies utilizing an appropriate modulation scheme, such as, for example, a 4-state, a 16-state, a 64-state, or other type of QAM scheme. PRS bursts may be conveyed by way of carrier signals $PRS_4$, $PRS_5$, and $PRS_6$ across a communications channel to mobile device 102.

Carrier signal $PRS_4$ may arrive at a mobile device 102 with sufficient signal strength to be acquired by receiver circuitry of the mobile device. An acquired signal corresponding to carrier signal $PRS_4$ may be represented as waveform 271 comprising a peak at $t_4$, for example. However, carrier signal $PRS_5$, which may propagate over a large distance, such as rural area 262, may undergo significant signal attenuation. In such an instance, mobile device 102 may be unable to acquire carrier signal $PRS_5$. In the example of FIG. 2B, waveform 272, which may represent a severely attenuated signal corresponding to carrier signal $PRS_5$, may be difficult to acquire by receiver circuitry of mobile device 102. Carrier signal $PRS_6$, which may undergo multipath fading responsive to propagating through a dense urban area, such as urban area 263, may arrive at mobile device 102 by way of direct and indirect paths. Responsive to receiving carrier signal $PRS_6$ by way of direct and indirect paths, waveform 273 may exhibit at least two peaks as shown in FIG. 2B, for example. In such instances, detection of peak $t_6$ may be problematic. Accordingly, as shown in the example of FIG. 2B, various phenomena may affect propagation of carrier signals, which may hinder or degrade an ability of the mobile device, such as mobile device 102, to acquire PRS bursts. Such difficulty may hinder a mobile device's ability to report values for $t_3-t_2$, $t_3-t_1$, and $t_2-t_1$, for example, to one or more of cellular base stations 110. In turn, computing an accurate estimated position of mobile device 102 may be problematic.

Figure 3:
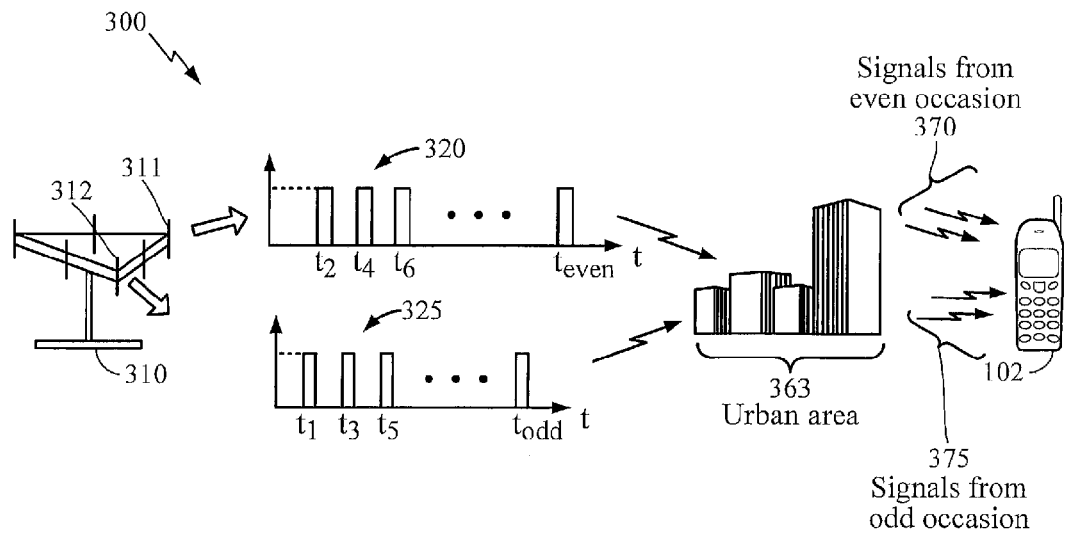
FIG. 3 is a schematic diagram of a portion of a cellular base station transmitting differing PRS bursts during differing types of occasions for reception by a mobile device according to an embodiment.

FIG. 3 is a schematic diagram 300 of a portion of a cellular base station transmitting differing PRS bursts during differing occasions for reception by a mobile device according to an embodiment. In FIG. 3, cellular base station 310 comprises many features similar to those of cellular base station 110 of FIG. 1 and FIGS. 2A-2B. However, in FIG. 3, base station 310 may be programmed or otherwise configured to operate in a diversity mode, in which, for example, one or more resource elements of base station 310 may be configured to transmit differing PRS bursts at or during differing occasions. In the example of FIG. 3, antennas 311 and 312 may be coupled to separate transmitter antenna ports that may represent resource elements utilized to transmit differing PRS bursts during differing occasions, such as during even occasions 320, which may be transmitted by way of antenna 311, and during odd occasions 325, which may be transmitted by way of antenna 312. In embodiments, a first antenna port may be utilized, for example, to transmit during a first type of occasion (e.g., "odd" occasions), and a second antenna port may be utilized, for example, to transmit during a second type of occasion (e.g., "even" occasions), for example. In an embodiment, carrier signals may be transmitted at times $t_2$, $t_4$, $t_6$ and so forth during even occasions 320. During odd occasions 325, carrier signals may be transmitted at times $t_1$, $t_3$, $t_5$ and so forth. It should be noted, however, that although FIG. 3 illustrates only two types of occasions (e.g., odd and even), other embodiments may utilize a greater number of types of occasions, such as three types, four types, etc., which may be coupled to an equivalent number of antennas (e.g., a third antenna, a fourth antenna, etc.) and claimed subject matter is not limited in this respect.

In the example of FIG. 3, responsive to transmission of even occasions 320, through antenna 311 and transmission of odd occasions 325, through antenna 312, effects of phenomena that may distort and/or attenuate carrier signals, such as PRS bursts, may be reduced. For example, if signals from even PRS occasion 370 interfere with one another, perhaps due to urban environment 363 introducing multipath interference, it may be possible that signals from odd PRS occasion 365 do not undergo similar multipath interference. Likewise, if signals transmitted during odd PRS occasion 375 interfere with one another, signals transmitted during even PRS occasions 370 may not undergo similar multipath interference. Thus, in certain embodiments, responsive to diversity in selection of transmitting antenna ports, which may be coupled to antenna 311 and 312, there is increased likelihood that PRS bursts can be received and acquired by mobile device 102.

As mentioned previously, a transmitter comprising antenna ports coupled to antennas 311 and 312 may alternate the transmission of PRS bursts. In one possible example, PRS bursts may be transmitted utilizing antenna 312 at odd multiples of approximately 160.0 milliseconds. Thus, odd transmission occasions may correspond to approximately 160.0 milliseconds, approximately 480.0 milliseconds, approximately 800.0 milliseconds, and so forth. Likewise, even transmission occasions, which may be transmitted utilizing antenna 311 at even multiples of approximately 160.0 milliseconds, may correspond to approximately 320.0 milliseconds, 640.0 milliseconds, approximately 960.0 milliseconds, and so forth. Such alternating transmission of PRS bursts may be summarized using the following expression:

$$\text{"Even" Occasions} \begin{cases} \text{Antenna 1: Amplitude} = a1 \\ \text{Antenna 2: Amplitude} = 0 \end{cases} \quad (1)$$

$$\text{"Odd" Occasions} \begin{cases} \text{Antenna 1: Amplitude} = 0 \\ \text{Antenna 2: Amplitud} = a1 \end{cases} \quad (2)$$

In which "Antenna 1" may correspond to at least one antenna port of a transmitter coupled to antenna 311 of FIG. 3. Likewise "Antenna 2" may correspond to at least one antenna port of a transmitter coupled to antenna 312 of FIG.

3. The variable "a1" in expressions 1 and 2 may correspond to a positioning reference-signal sequence as defined in Chapter 6.10.4.1 of LTE; Evolved Universal Terrestrial Radio Access (E-UTRA); Physical channels and modulation (ETSI TS 36.211 Version 10.0.0 Release 10).

In other embodiments, antennas 311 and 312, which may be coupled to individual antenna ports of a transmitter, for example, may simultaneously transmit PRS bursts during even and odd occasions but with variations in OFDM symbol polarity between even and odd occasions. Thus, in one possible example, PRS bursts may be transmitted through antenna output ports coupled to antennas 311 and 312 during both even occasions and odd occasions. Transmission during even occasions (e.g., $t_2$, $t_4$, $t_6$, etc.) may be summarized using the expression:

$$\text{Even Occasions} \begin{cases} \text{Antenna 1: Amplitude} = a2 \\ \text{Antenna 2: Amplitude} = a2 \end{cases} \quad (3)$$

During odd occasions (e.g., $t_1$, $t_3$, $t_5$, etc.), OFDM symbol polarity may be inverted or reversed, which may be summarized using the expression:

$$\text{Odd Occasions} \begin{cases} \text{Antenna 1: Amplitude} = a2 \\ \text{Antenna 2: Amplitude} = -a2 \end{cases} \quad (4)$$

Wherein the variable "a2" may correspond to a positioning reference-signal sequence as defined in Chapter 6.10.4.1 of LTE; Evolved Universal Terrestrial Radio Access (E-UTRA); Physical channels and modulation (ETSI TS 36.211 Version 10.0.0 Release 10).

Thus, diversity in use of output antenna ports of a transmitter of a cellular base station, such as cellular base station 310, may permit mobile devices, such as mobile device 102, to acquire received PRS bursts. In some embodiments, first and second antenna ports of a transmitter may alternate, for example, in which a first antenna port may be used to transmit during a first type of occasion (e.g., odd occasions), and a second antenna port may be used to transmit during a second type of occasion (e.g., even occasions). In certain embodiments, an increased amplitude signal may be transmitted, so that time-averaged power of a PRS bursts may remain at a fixed level with respect to other embodiments. In some implementations, simultaneous transmissions, in which two or more transmitter antenna ports may simultaneously transmit PRS bursts, may further increase likelihood of acquisition of PRS bursts by a mobile device.

Additionally, in some implementations, changes in symbol polarity may give rise to further increases in likelihood of acquisition of PRS bursts. It should be noted, again, that although FIG. 3 describes variations in transmission of PRS bursts among first and second types of occasions, such as even and odd occasions, other embodiments may employ a larger number of types of occasions, such as three types, four types, and so forth, and claimed subject matter is not limited in this respect. In one example, first, second, third, and fourth types of PRS bursts may be transmitted by way of an equivalent number of separate antenna ports of a transmitter which may, for example, be coupled to individual antennas of cellular base station 310. Further, embodiments may employ multiple subcarriers. For example, signals transmitted during even PRS occasions may be transmitted using a first subcarrier (e.g., approximately 0.0 kHz to approximately 15.0 kHz), and signals during odd PRS occasions may be transmitted using a second subcarrier, such as approximately 30.0 kHz to approximately 45.0 kHz.

Figure 4:
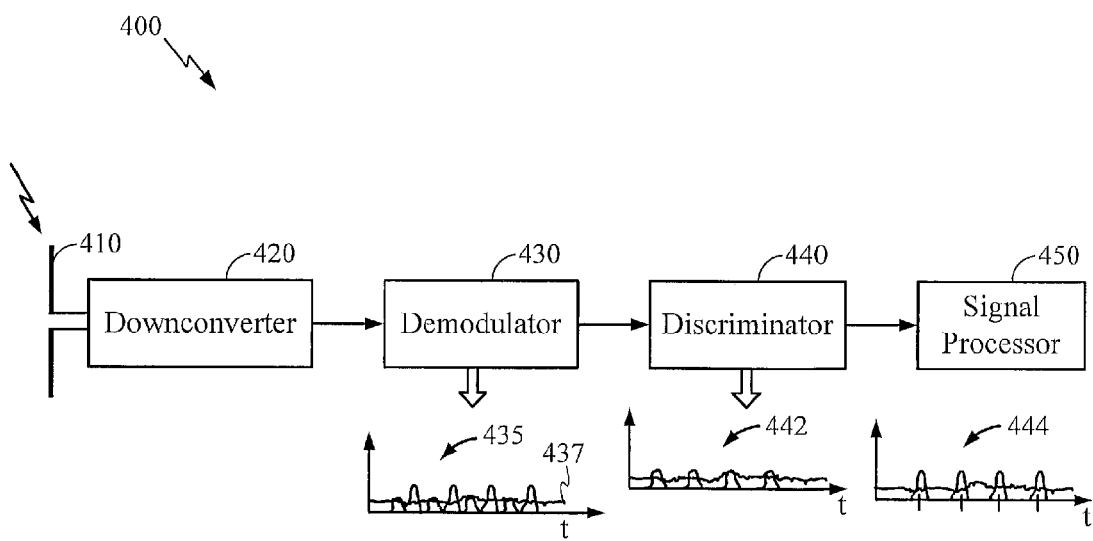
FIG. 4 is a schematic diagram of a portion of a mobile device configured to extract performance criteria from acquired PRS bursts transmitted during differing types of occasions according to an embodiment.
Figure 7:
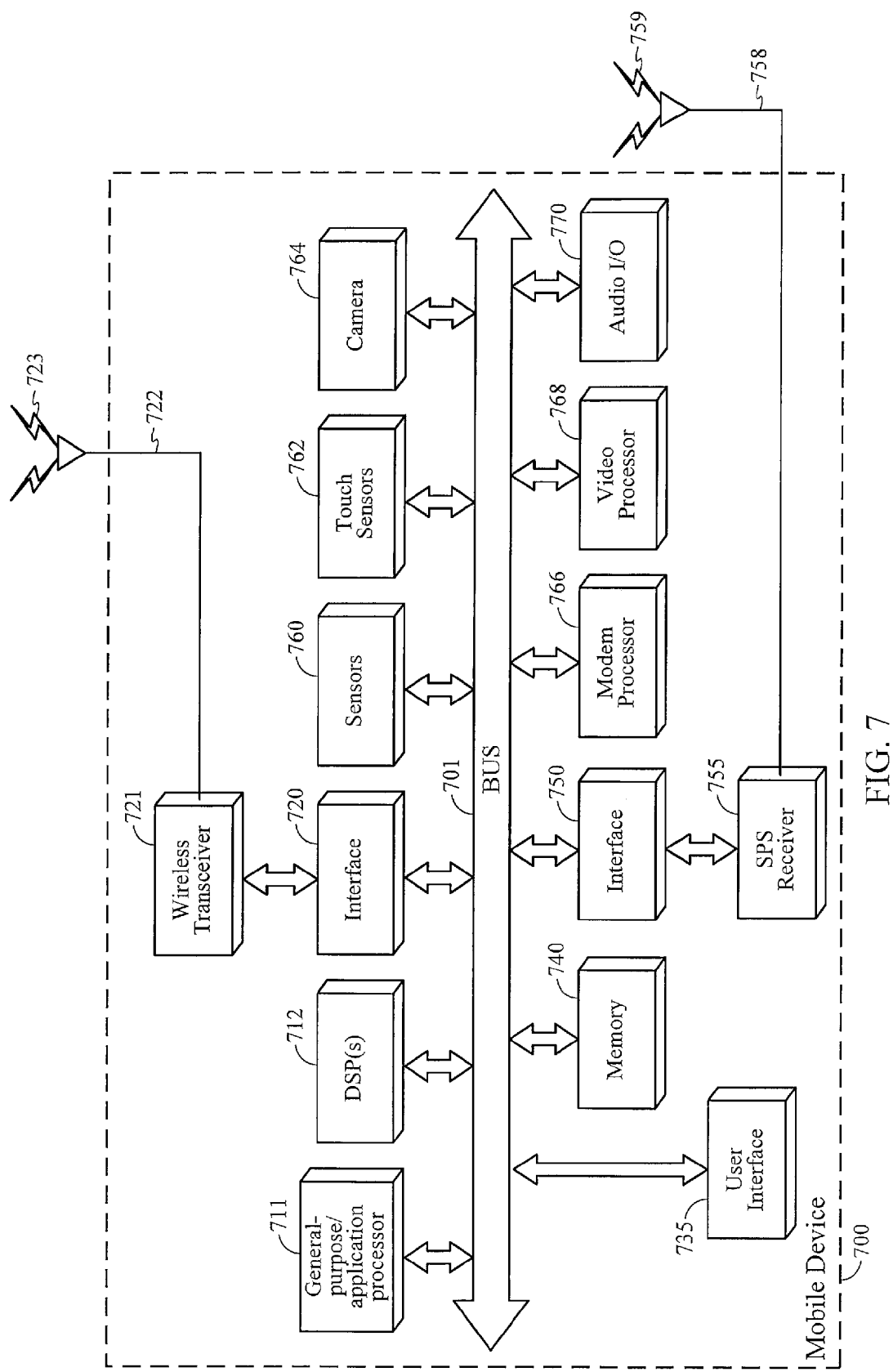
FIG. 7 a schematic block diagram illustrating an exemplary device, in accordance with an embodiment.

FIG. 4 is a schematic diagram 400 of a portion of a mobile device configured to extract performance criteria from acquired PRS bursts transmitted during differing occasions according to an embodiment. In the interest of simplicity in describing FIG. 4, some functional elements of mobile device 102, such as power supplies, displays, user interfaces, and so forth are not illustrated but are illustrated in FIG. 7 herein. In FIG. 4, a carrier signal, which may represent one or more PRS bursts, may impinge on mobile device antenna 410. It should be noted that a mobile device may comprise additional antennas other than antenna 410, and claimed subject matter is not limited to mobile devices comprising any particular number of antennas. In some embodiments, for example, a mobile device may comprise two antennas, wherein a first antenna may be suitable for receiving horizontally polarized signals, and a second antenna may be suitable for receiving vertically polarized signals. In FIG. 4, output signals from an output port of antenna 410 may be conveyed to an input port of downconverter 420. Downconverter 420 may convert carriers and/or subcarriers comprising PRS bursts from one or more frequencies proximate with a center frequency to one or more baseband frequencies, for example.

Output signals from downconverter 420 may be applied to an input port of demodulator 430. In embodiments, demodulator 430 may comprise an OFDM demodulator that may detect presence of PRS bursts from, for example, transmitted during first and second occasions (e.g., odd and even occasions). Demodulated waveforms from first and second transmission types of occasions comprising PRS bursts may be represented by waveforms 435, in which certain acquired signals may comprise performance criteria, such as greater signal strength, based, at least in part, on a comparison with other acquired signals. As previously alluded to, reductions in relative signal strength may be in response to a distortion brought about by multipath interference, attenuation, and/or various other phenomena.

Signals from one or more output ports of demodulator 430 may be conveyed to one or more input ports of discriminator 440. In embodiments, a discriminator 440 may evaluate one or more of waveforms 435 to detect performance criteria of acquired signals. If performance criteria of acquired signals can be detected or extracted, discriminator 440 may be capable of distinguishing waveforms representing PRS bursts transmitted during a first type of occasion from waveforms representing PRS bursts transmitted during a second type of occasion. In embodiments, PRS bursts of a first type of occasion may be transmitted through an antenna port coupled to antenna 312 (FIG. 3), for example, and PRS bursts of a second type of occasion may be transmitted through an antenna port coupled to antenna 311, for example. Responsive to receipt of signals from demodulator 430, discriminator 440 may compute a signal-to-noise ratio of one or more of waveforms 435 and designate one or more waveforms to first and second types of occasions. In some embodiments, this may permit discriminator 440 to discard, for example, weaker signals, such as one or more of waveforms 435 of amplitude comparable to noise floor 437. In FIG. 4, discarded waveforms may correspond, for example, to waveforms 442, which may comprise amplitude lower than noise floor 437, for example. Responsive to discarding waveforms 442, signal processor 450 may process waveforms 444, which may comprise signals measuring signals having amplitude significantly higher than noise floor 437 (e.g., signals having greater signal-to-noise ratio). Responsive to receipt of signals from an output port of discriminator 440, signal processor 450 may be capable of performing signal processing operations such as integration, peak detection, autocorrelation, and so forth. Signal processor 450 may perform additional operations in addition to or in place of the aforementioned and claimed subject matter is not limited in this respect.

In certain implementations, discriminator 440 may cooperate with signal processor 450 to extract performance criteria, such as frequency content of acquired signals. For example, in some embodiments, Fourier analysis, such as a fast Fourier transform, may be performed on one or more of waveforms 435. Fourier analysis may enable designating one or more of acquired waveforms 435 as having been transmitted through a first transmitter antenna port and designating other waveforms of acquired waveforms 435 as having been transmitted through a second transmitter antenna port. This may be advantageous, for example, in implementations in which one or more cellular base stations make use of multiple subcarriers to transmit PRS bursts arranged for transmission during first and second types of occasions. In such implementations, use of Fourier analysis may detect use of resource elements (e.g., transmitter output ports) comprising different subcarrier frequencies. For example, in one possible implementation, PRS bursts transmitted during a first type of occasion may be coupled to a first transmitter antenna port and may make use of subcarrier frequencies of, for example approximately 0.0 kHz to approximately 15.0 kHz. PRS bursts transmitted during a second type of occasion may be coupled to a second transmitter antenna port and may be transmitted using subcarrier frequencies of, for example, approximately 30.0 kHz to approximately 45.0 kHz.

In certain implementations, discriminator 440 may cooperate with signal processor 450 to determine performance criteria comprising changes in symbol polarity between PRS bursts transmitted through a first antenna port and PRS bursts transmitted through a second antenna port. For example, PRS bursts transmitted through a first transmitter antenna port may utilize, for example, one or more OFDM symbols of a first polarity, and PRS bursts transmitted through a second transmitter antenna port may utilize one or more OFDM symbols of a second polarity. Accordingly, discriminator 440 and/or signal processor 450 may perform one or more comparisons among acquired PRS bursts to detect changes in polarity among symbols detected in PRS bursts. In response to one or more comparisons among acquired PRS bursts, discriminator 440 and/or signal processor 450 may designate a PRS bursts comprising a first performance criteria (e.g., positive symbol polarity) as being transmitted during a first type of occasion. PRS bursts comprising second performance criteria (e.g., negative symbol polarity) may be designated as being transmitted during a second type of occasion.

In particular embodiments, a cellular base station, such as cellular base station 110, may transmit an information block or other identifier that may be used to inform a mobile device of differing performance criteria among received PRS bursts. Thus, for example, one or more identifiers may permit discriminator 440 and/or signal processor 450 may be preconfigured with settings that may allow efficient discrimination of PRS bursts transmitted during a first type of occasion from PRS bursts transmitted during a second type of occasion. Preconfiguration may be especially useful in implementations in which, for example, a cellular base station transmits PRS bursts using multiple antennas, such as, for example, three or more antennas. In embodiments, discriminator 440 and/or signal processor 450 may be capable of assigning acquired PRS bursts to a preconfigured number of discrete frequency and/or time correlation bins, thereby reducing time consumed in sorting PRS pulses. It should be noted that use of information blocks from one or more cellular base station may bring about additional benefits, and claimed subject matter is not this respect.

In certain embodiments, a cellular base station may transmit a cell-specific reference signal, which may be acquired by a mobile device and used to determine whether a particular base station makes use of differing PRS bursts transmitted using differing occasions. For example, upon acquisition of a cell-specific reference signal, a mobile device may store in a memory device a data file comprising an arrangement of indicators identifying cellular base stations and whether a cellular base station transmits PRS bursts during differing occasions. This may permit a mobile device to preconfigure discriminator 440 and/or signal processor 450 with settings that may allow efficient discrimination and/or signal processing of PRS bursts. Responsive to accessing a listing of an index of cellular base stations and associated PRS burst types of occasions, a mobile device may designate one or more PRS bursts comprising first detected or extracted performance criteria as being a PRS burst transmitted during a first type of occasion. Also in response to accessing the listing, PRS bursts comprising second detected or extracted performance criteria may be designated as being a PRS burst transmitted during a second type of occasion.

Figure 5:
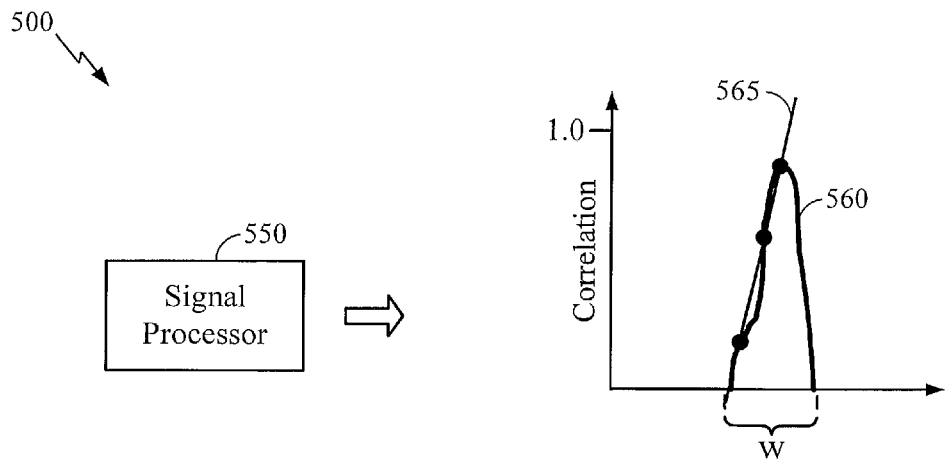
FIG. 5 is a diagram of a correlation peak that may represent an output signal from a signal processor according to an embodiment.

FIG. 5 is a diagram of a correlation peak that may represent an output signal from a signal processor according to an embodiment. In FIG. 5, a signal processor, which may accord with signal processor 450 of FIG. 4, for example, may generate an output signal, such as correlation peak 560. Correlation peak of 560 may comprise a width, such as width "w," which may be compared with one or more nominal correlation peaks, for example, stored in a memory device accessible to a mobile device, for example. Correlation peaks may be detected in a time domain, frequency domain, or responsive to any other correlation approach, and claimed subject matter is not limited in this respect.

In particular embodiments, correlation peak 560 may be analyzed to detect a best defined correlation peak among correlation peaks generated by signal processor 550. As alluded to previously, correlation peaks may be determined in a time domain, frequency domain, or any other applicable signal processing domain. Best correlation peaks may be detected by measuring the slope between points of a correlation peak, such as slope 565 of FIG. 5.

Figure 6:
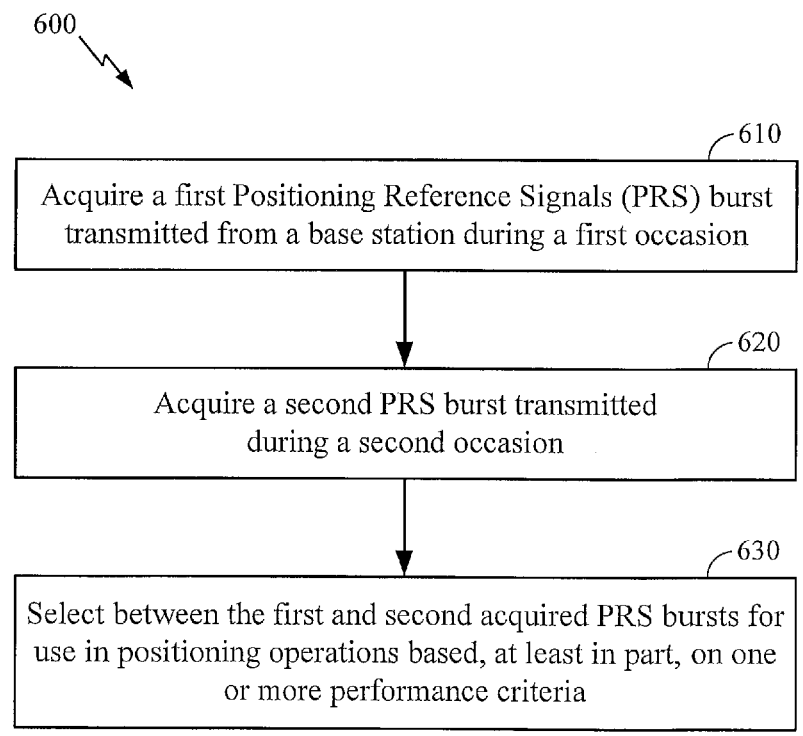
FIG. 6 is a flow diagram of a method for processing positioning reference signals transmitted during differing occasions according to an embodiment.

FIG. 6 is a flow diagram of a method for processing position reference signals transmitted during differing occasion types according to an embodiment. Although the method of FIG. 6 may be performed by a mobile device acquiring and processing signals from a cellular base station, for example, in other embodiments, the method of FIG. 6 may be performed by a mobile device acquiring signals from other types of transmitters, and claimed subject matter is not limited in this respect. Example implementations, such as those described in FIG. 6, may include blocks in addition to those shown and described, fewer blocks, blocks occurring in an order different than may be identified, or any combination thereof.

At block 610, a mobile device may acquire a first PRS burst transmitted from a base station during a first occasion using any one of the aforementioned techniques. For example, a first PRS burst may be transmitted by way of antenna 311 of cellular base station 310 and acquired by mobile device 102 as shown in FIG. 3. The method may continue at block 620, wherein a mobile device may acquire a second PRS burst transmitted from a base station during a second occasion. For example, a second PRS burst may be transmitted by way of antenna 312 of cellular base station 310 and acquired by mobile device 102. At block 630, a discriminator and/or a signal processor of a mobile device, for example, may select between the first and second acquired PRS bursts for use in positioning operations based, at least in part, on one or more performance criteria of a PRS burst, such as signal-to-noise ratio, frequency content, symbol polarity, and so forth.

FIG. 7 is a schematic diagram of a mobile device according to an embodiment. Mobile device 102 (FIG. 1) may comprise one or more features of mobile device 700 shown in FIG. 7. In certain embodiments, mobile device 700 may also comprise wireless transceiver 721, which is capable of transmitting and receiving wireless signals 723 via antenna 722 over a wireless communication network. Wireless transceiver 721 may be coupled to bus 701 by way of wireless transceiver bus interface 720. Wireless transceiver bus interface 720 may, in some embodiments be at least partially integrated with wireless transceiver 721. Some embodiments may include, for example, multiple wireless transceivers 721 and wireless antennas 722 to enable transmitting and/or receiving signals according to corresponding multiple wireless communication standards for Wide Area Networks (WAN), Wireless Local Area Networks (WLAN), Personal Area Networks (PAN), etc. Such as, for example, versions of IEEE Std. 802.11, CDMA, WCDMA, LTE, UMTS, GSM, AMPS, Zigbee, and Bluetooth, just to name a few examples.

Mobile device 700 may also comprise SPS receiver 755 capable of acquiring and processing SPS signals 759 via SPS antenna 758. SPS receiver 755 may also process, in whole or in part, acquired SPS signals 759 for estimating a location of mobile device 700. In some embodiments, general-purpose processor(s) 711, memory 740, DSP(s) 712 and/or specialized processors (not shown) may also be utilized to process acquired SPS signals, in whole or in part, and/or calculate an estimated location of mobile device 700, in conjunction with SPS receiver 755. Storage of SPS or other signals for use in performing positioning operations may be performed in memory 740 or registers (not shown).

Also shown in FIG. 7, mobile device 700 may comprise digital signal processor(s) (DSP(s)) 712 that may comprise an interface to bus 701. General-purpose processor(s) 711 may comprise an interface to bus 701 and may comprise an interface to memory 740. A bus interface may be integrated with the DSP(s) 712, general-purpose processor(s) 711 and memory 740. In various embodiments, functions may be performed in response execution of one or more machine-readable instructions stored in memory 740 such as on a computer-readable storage medium, such as RAM, ROM, FLASH, or disc drive, just to name a few example. The one or more instructions may be executable by general-purpose processor(s) 711, specialized processors, or DSP(s) 712. Memory 740 may comprise a non-transitory processor-readable memory and/or a computer-readable memory that stores software code (programming code, instructions, etc.) that are executable by processor(s) 711 and/or DSP(s) 712 to perform functions described herein. Memory 740 may store a data file comprising an arrangement of indicators identifying cellular base stations and whether a cellular base station transmits PRS bursts during differing occasions.

Also shown in FIG. 7, a user interface 735 may comprise any one of several devices such as, for example, a speaker, microphone, display device, vibration device, keyboard, touch screen, just to name a few examples. In a particular implementation, user interface 735 may enable a user to interact with one or more applications hosted on mobile device 700. For example, devices of user interface 735 may store analog or digital signals on memory 740 to be further processed by DSP(s) 712 or general-purpose processor 711 in response to action from a user. Similarly, applications hosted on mobile device 700 may store analog or digital signals on memory 740 to present an output signal to a user. In implementations, a user may interact with user interface 735 to determine an estimated location of the mobile device. The estimated location may be determined by acquiring PRS bursts transmitted from one or more cellular base stations during differing occasions. In response to downconversion, demodulation, and signal processing operations, wireless transceiver 721 may transmit differences in time of arrival of acquired PRS bursts. Responsive to receipt of differences in time of arrival of acquired PRS bursts, one or more cellular base stations may transmit an estimated position of a mobile device, which may be rendered by video processor 768 for display on a display device.

In an implementation, mobile device 700 may include a dedicated audio input/output (I/O) device 770 comprising, for example, a dedicated speaker, microphone, digital to analog circuitry, analog to digital circuitry, amplifiers, and/or gain control. It should be understood, however, that this is merely an example of how an audio I/O may be implemented in a mobile device, and that claimed subject matter is not limited in this respect. In another implementation, mobile device 700 may comprise touch sensors 762 responsive to touching or pressure on a keyboard or touch screen device.

Mobile device 700 may also comprise a dedicated camera device 764 for capturing still or moving imagery. Camera device 764 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 711 or DSP(s) 712. Alternatively, a dedicated video processor 768 may perform conditioning, encoding, compression, or manipulation of signals representing captured images. Additionally, video processor 768 may decode/decompress stored image data for presentation on a display device (not shown) on mobile device 700.

Mobile device 700 may also comprise sensors 760 coupled to bus 701, which may include, for example, inertial sensors and environment sensors. Inertial sensors of sensors 760 may comprise, for example accelerometers (e.g., collectively responding to acceleration of mobile device 700 in three dimensions), one or more gyroscopes or one or more magnetometers (e.g., to support one or more compass applications). Environment sensors of mobile device 700 may comprise, for example, temperature sensors, barometric pressure sensors, ambient light sensors, camera imagers, microphones, just to name few examples. Sensors 760 may generate analog or digital signals that may be stored in memory 740 and processed by general purpose application processor 711 in support of one or more applications such as, for example, applications directed to positioning or navigation operations.

In a particular implementation, mobile device 700 may comprise a dedicated modem processor 766 capable of performing baseband processing of signals received and downconverted at wireless transceiver 721 or SPS receiver 755. Similarly, modem processor 766 may perform baseband processing of signals to be upconverted for transmission by wireless transceiver 721. In alternative implementations, instead of comprising a dedicated modem processor, baseband processing may be performed by a general-purpose processor or DSP (e.g., general purpose/application processor 711 or DSP(s) 712). It should be understood, however, that these are merely examples of structures that may perform baseband processing, and that claimed subject matter is not limited in this respect.

In a particular implementation, mobile device 700 may be capable of performing one or more of the actions set forth in the process of FIG. 7. For example, general-purpose application processor 711 may perform all or a portion of actions at blocks 610, 620, and/or 630.

Figure 8:
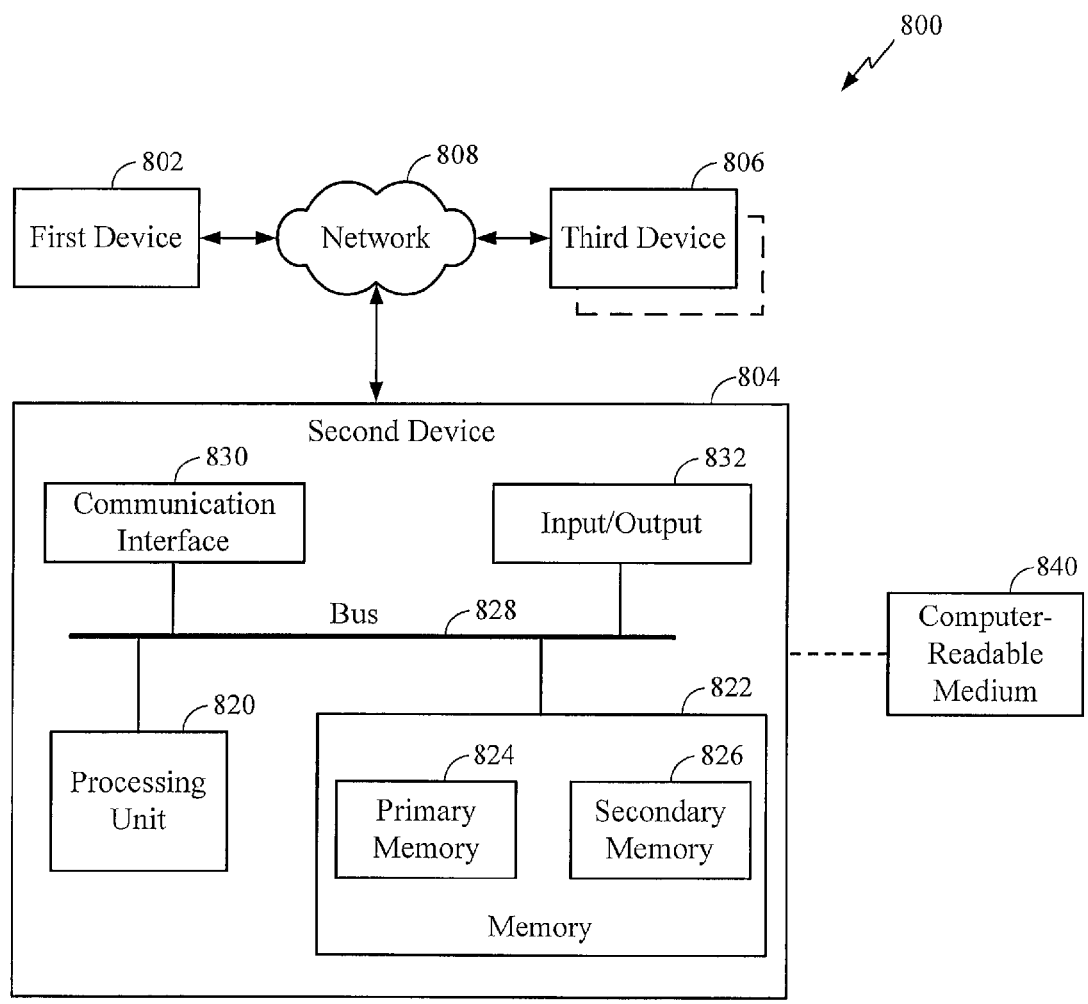
FIG. 8 is a schematic block diagram of an example computing platform in accordance with an embodiment.

FIG. 8 is a schematic diagram illustrating an example system 800 that may include one or more devices configurable to implement techniques or processes described above, for example, in connection with FIGS. 3 and 4. System 800 may include, for example, a first device 802, a second device 804, and a third device 806, which may be operatively coupled through a wireless communications network 808. In an aspect, first device 802 may comprise a server capable of providing positioning assistance data such as, for example, a base station almanac, an information block that may inform a mobile device of use by one or more cellular base station of a use of differing occasions during which PRS bursts are transmitted. In another aspect, a mobile device may use a base station almanac that may associate cell-specific reference signals with use of multiple types of occasions during which PRS bursts are transmitted. Second and third devices 804 and 806 may comprise mobile devices, in an aspect. In addition, in an aspect, wireless communications network 808 may comprise one or more cellular base stations and/or wireless access points, for example. However, claimed subject matter is not limited in scope in these respects.

First device 802, second device 804 and third device 806, as shown in FIG. 8, may be representative of any device, appliance or machine (e.g., such as wireless transmitter 115 or servers 140, 150 or 155 as shown in FIG. 1) that may be configurable to exchange data over wireless communications network 808. By way of example but not limitation, any of first device 802, second device 804, or third device 806 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 802, 804, and 806, respectively, may comprise one or more of a base station almanac server, a base station, or a mobile device in accordance with the examples described herein.

Similarly, communications network 808 (e.g., in a particular of implementation of network 130 shown in FIG. 1), may be representative of one or more communication links, processes, or resources configurable to support the exchange of data between at least two of first device 802, second device 804, and third device 806. By way of example but not limitation, communications network 808 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 806, there may be additional like devices operatively coupled to wireless communications network 808. Thus, by way of example but not limitation, second device 804 may include at least one processing unit 820 that is operatively coupled to a memory 822 through a bus 828. It is recognized that all or part of the various devices and networks shown in system 800, and the processes and methods as further described herein, may be implemented using or otherwise including hardware, firmware, software, or any combination thereof.

Processing unit 820 is representative of one or more circuits configurable to perform at least a portion of a data computing procedure or process. By way of example but not limitation, processing unit 820 may include one or more processors, controllers, microprocessors, microcontrollers, application specific integrated circuits, digital signal processors, programmable logic devices, field programmable gate arrays, and the like, or any combination thereof.

Memory 822 is representative of any data storage mechanism. Memory 822 may include, for example, a primary memory 824 or a secondary memory 826. Primary memory 824 may include, for example, a random access memory, read only memory, etc. While illustrated in this example as being separate from processing unit 820, it should be understood that all or part of primary memory 824 may be provided within or otherwise co-located/coupled with processing unit 820.

In particular implementation, second device 804 may be capable of rendering an estimated location of a mobile device. For example, second device 804 may receive parameters in messages receiving from a client STA, receiving STA and/or sending STA through communication network 808 for use in forming expressions for use in computing an estimated location of the client STA. In certain implementations, a transceiver (not shown) of a second device 804 may transmit an estimated location of second device 804 to first device 802. Responsive to computing an estimated location, in response to time differences of acquired PRS bursts, first device 802 may transmit an estimated location of second device 804. Second device 804 may display one or more estimated positions by way of a display device (not shown) coupled to, for example bus 828. Secondary memory 826 may include, for example, the same or similar type of memory as primary memory or one or more data storage devices or systems, such as, for example, a disk drive, an optical disc drive, a tape drive, a solid state memory drive, etc. In certain implementations, secondary memory 826 may be operatively receptive of, or otherwise configurable to couple to, a computer-readable medium 840. Computer-readable medium 840 may include, for example, any non-transitory medium that can carry or make accessible data, code or instructions for one or more of the devices in system 800. Computer-readable medium 840 may also be referred to as a storage medium.

Second device 804 may include, for example, a communication interface 830 that provides for or otherwise supports the operative coupling of second device 804 to at least wireless communications network 808. By way of example but not limitation, communication interface 830 may include a network interface device or card, a modem, a router, a switch, a transceiver, and the like.

Second device 804 may include, for example, an input/output device 832. Input/output device 832 is representative of one or more devices or features that may be configurable to accept or otherwise introduce human or machine inputs, or one or more devices or features that may be configurable to deliver or otherwise provide for human or machine outputs. By way of example but not limitation, input/output device 832 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Memory 822 may represent any suitable or desired information storage medium. For example, memory 822 may include a primary memory 824 and a secondary memory 826. Primary memory 824 may include, for example, a random access memory, read only memory, etc. While illustrated in this example as being separate from a processing unit, it should be appreciated that all or part of primary memory 824 may be provided within or otherwise co-located/coupled with processing unit 820. Secondary memory 826 may include, for example, the same or similar type of memory as primary memory or one or more information storage devices or systems, such as, for example, a disk drive, an optical disc drive, a tape drive, a solid state memory drive, etc. In certain implementations, secondary memory 826 may be operatively receptive of, or otherwise enabled to be coupled to, a non-transitory computer-readable medium 840.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered a self-consistent sequence of operations or similar signal processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a mobile device:
    acquiring a first Positioning Reference Signals (PRS) burst transmitted from a base station during a first occasion;
    acquiring a second PRS burst transmitted from said base station during a second occasion; and
    selecting between said first and second acquired PRS bursts for use in positioning operations based, at least in part, on one or more performance criteria.

2. The method of claim 1, wherein said one or more performance criteria comprises at least a signal-to-noise ratio.

3. The method of claim 1, wherein said one or more performance criteria comprises at least a best defined correlation peak.

4. The method of claim 3, wherein said best defined correlation peak is measured in a time domain or in a frequency domain.

5. The method of claim 3, wherein said one or more performance criteria comprises at least a comparison of a width of said best defined correlation peak to a nominal correlation peak width.

6. The method of claim 1, wherein said selecting further comprises:
    comparing one or more symbols detected in said acquired second PRS burst with one or more symbols detected in said first acquired PRS burst.

7. The method of claim 6, wherein said comparing comprises:
    determining whether said one or more symbols detected in said second acquired PRS burst is of a different polarity than said one or more symbols detected in said first acquired PRS burst.

8. The method of claim 1, further comprising:
    designating said first acquired PRS burst as being transmitted during said first occasion based, at least in part, on said first acquired PRS burst comprising a first performance criteria of said one or more performance criteria; and
    designating said second acquired PRS burst as being transmitted during said second occasion based, at least in part, on said second acquired PRS burst comprising a second of said one or more performance criteria different than said first performance criteria.

9. The method of claim 1, further comprising:
    storing in a memory device one or more indicators to identify whether a base station transmits differing PRS bursts during differing occasions.

10. A mobile device, comprising:
    a receiver to receive signals from a communications channel; and
    one or more processors coupled to said receiver to:
        acquire a first Positioning Reference Signals (PRS) burst received at said receiver and transmitted from a base station during a first occasion;
        acquire a second PRS burst transmitted from said base station during a second occasion; and
        select between said first and second acquired PRS bursts for use in positioning operations based, at least in part, on one or more performance criteria.

11. The mobile device of claim 10, wherein said one or more processors are additionally to:
    select between said first and second acquired PRS bursts based, at least in part, on said one or more performance comprising signal-to-noise of said first and said second acquired PRS bursts.

12. The mobile device of claim 10, wherein said one or more processors are additionally to:
    select between said first and second acquired PRS bursts based, at least in part, on said one or more performance criteria comprising a best defined correlation peak of said first and said second acquired PRS bursts.

13. The mobile device of claim 12, wherein said one or more processors are additionally to:
    compute, in a time domain or in a frequency domain, said best defined correlation peak.

14. The mobile device of claim 10, wherein said one or more processors are additionally to:
    select between said first and second acquired PRS bursts based, at least in part, on a comparison of a measured correlation peak width to a nominal correlation peak width.

15. The mobile device of claim 10, wherein said one or more processors are additionally to:
    compare one or more symbols detected in said second acquired PRS burst with one or more symbols detected in said first acquired PRS burst.

16. The mobile device of claim 15, wherein said one or more processors are additionally to:
    determine whether said one or more symbols detected in said second acquired PRS burst is of a different polarity than said one or more symbols detected in said first acquired PRS burst.

17. The mobile device of claim 10, wherein said one or more processors are additionally to:
    designate said first acquired PRS burst as being transmitted during a first type of occasion based, at least in part on said first acquired PRS burst comprising a first performance criteria of said one or more performance criteria; and
    designate said second acquired PRS burst as being transmitted during a second type of occasion based, at least in part, on said second acquired PRS burst comprising a second of said one or more performance criteria different than said first performance criteria.

18. The mobile device of claim 10, wherein said one or more processors are additionally to:
    store, in a memory device, one or more indicators for identifying whether a base station transmits differing PRS bursts during differing occasions.

19. An article comprising:
    a non-transitory storage medium comprising machine-readable instructions stored thereon which are executable by one or more processors of a mobile device to:

acquire a first Positioning Reference Signals (PRS) burst transmitted from a base station during a first occasion;

acquire a second PRS burst transmitted from said base station during a second occasion; and select between said first and second acquired PRS bursts for use in positioning operations based, at least in part, on one or more performance criteria.

20. The article of claim 19, wherein said non-transitory storage medium comprising machine-readable instructions stored thereon which are executable by one or more processors of said mobile device are additionally to:

select between said first and second acquired PRS bursts based, at least in part, on said one or more performance criteria comprising signal-to-noise of said first and said second acquired PRS bursts.

21. The article of claim 19, wherein said non-transitory storage medium comprising machine-readable instructions stored thereon which are executable by one or more processors of said mobile device are additionally to:

select between said first and second acquired PRS bursts based, at least in part, on said one or more performance criteria comprising a best defined correlation peak of said first and said second acquired PRS bursts.

22. The article of claim 21, wherein said non-transitory storage medium comprising machine-readable instructions stored thereon which are executable by one or more processors of said mobile device are additionally to:

compute, in a time domain or in a frequency domain, said best defined correlation peak.

23. The article of claim 19, wherein said non-transitory storage medium comprising machine-readable instructions stored thereon which are executable by one or more processors of said mobile device are additionally to:

select between said first and second acquired PRS bursts based, at least in part, on a comparison of a measured correlation peak width to a nominal correlation peak width.

24. The article of claim 19, wherein said non-transitory storage medium comprising machine-readable instructions stored thereon which are executable by one or more processors of said mobile device are additionally to:

designate said first acquired PRS burst as being transmitted during a first type of occasion based, at least in part, on said first acquired PRS burst comprising a first performance criteria of said one or more performance criteria; and designate said second acquired PRS burst as being transmitted during a second type of occasion based, at least in part, on said second acquired PRS burst comprising a second of said one or more performance criteria different than said first performance criteria.

25. The article of claim 19, wherein said non-transitory storage medium comprising machine-readable instructions stored thereon which are executable by one or more processors of said mobile device are additionally to:

store, in a memory device, one or more indicators for identifying whether a base station transmits differing PRS bursts during differing occasions.

26. A mobile device, comprising:

means for acquiring a first Positioning Reference Signals (PRS) burst transmitted from a base station during a first occasion;

means for acquiring a second PRS burst transmitted from said base station during a second occasion; and means for selecting between said first and second acquired PRS bursts for use in positioning operations based, at least in part, on one or more performance criteria.

27. The mobile device of claim 26, further comprising:

means for computing signal-to-noise ratio of said first acquired PRS burst and said second acquired PRS burst.

28. The mobile device of claim 26, further comprising:

means for computing a best defined correlation peak of said first acquired PRS burst and said second acquired PRS burst.

29. The mobile device of claim 26, further comprising:

means for determining whether one or more symbols detected in said second acquired PRS burst is of a different polarity than one or more symbols detected in said first acquired PRS burst.

30. The mobile device of claim 26, further comprising:

means for designating said first acquired PRS burst as being transmitted during a first type of occasion based, at least in part, on said first acquired PRS burst comprising a first performance criteria of said one or more performance criteria; and means for designating said second acquired PRS burst as being transmitted during a second type of occasion based, at least in part, on said second acquired PRS burst comprising a second of said one or more performance criteria different than said first performance criteria.

* * * * *